United States Patent
Kawai et al.

(10) Patent No.: US 11,824,638 B2
(45) Date of Patent: Nov. 21, 2023

(54) RE-ENCRYPTION DEVICE, METHOD AND COMPUTER READABLE MEDIUM TO CHANGE THE ACCESS RANGE FOR CIPHERTEXT

(71) Applicant: MITSUBISHI ELECTRIC CORPORATION, Tokyo (JP)

(72) Inventors: Yutaka Kawai, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 128 days.

(21) Appl. No.: 17/493,262

(22) Filed: Oct. 4, 2021

(65) Prior Publication Data

US 2022/0029795 A1 Jan. 27, 2022

Related U.S. Application Data

(63) Continuation of application No. PCT/JP2019/020718, filed on May 24, 2019.

(51) Int. Cl.
*H04L 9/08* (2006.01)
*H04L 9/30* (2006.01)

(52) U.S. Cl.
CPC .......... *H04L 9/0825* (2013.01); *H04L 9/0869* (2013.01); *H04L 9/3006* (2013.01)

(58) Field of Classification Search
None
See application file for complete search history.

(56) References Cited

U.S. PATENT DOCUMENTS

| | | | | |
|---|---|---|---|---|
| 2008/0170701 A1* | 7/2008 | Matsuo | ................... | H04L 9/083 380/45 |
| 2016/0234012 A1* | 8/2016 | Kawai | ................... | H04L 9/0861 |
| 2016/0344708 A1* | 11/2016 | Kawai | ................... | H04L 9/0869 |

FOREIGN PATENT DOCUMENTS

| | | |
|---|---|---|
| JP | 2015-213233 A | 11/2015 |
| JP | 2016-76759 A | 5/2016 |
| JP | 6270683 B2 | 1/2018 |

(Continued)

OTHER PUBLICATIONS

International Search Report, issued in PCT/JP2019/020718, dated Aug. 13, 2019.

(Continued)

*Primary Examiner* — Bassam A Noaman
(74) *Attorney, Agent, or Firm* — BIRCH, STEWART, KOLASCH & BIRCH, LLP

(57) ABSTRACT

A cryptographic system comprising an encryption device to generate a ciphertext; a master re-encryption key generation device to generate a master re-encryption key that cannot decrypt a ciphertext generated by the encryption device, but can generate a re-encryption key for changing an access range for a ciphertext generated by the encryption device; re-encryption device to generate a re-encryption key for re-encrypting a target ciphertext generated by the encryption device, using the master re-encryption key, and re-encrypts the target ciphertext to generate a re-encrypted ciphertext, using the generated re-encryption key; and a decryption device to decrypt at least one of the ciphertext generated by the encryption device and the re-encrypted ciphertext generated by the re-encryption device.

7 Claims, 13 Drawing Sheets

(56) References Cited

FOREIGN PATENT DOCUMENTS

WO  WO-2012147869 A1 * 11/2012  .......... H04L 9/0861
WO  WO 2014/083784 A1   6/2014

OTHER PUBLICATIONS

Kawai, "Outsourcing the Re-encryption Key Generation: Flexible Ciphertext-Policy Attribute-Based Proxy Re-encryption". ISPEC, 2015, pp. 301-315.
Lai et al., "Adaptable Ciphertext-Policy Attribute-Based Encryption", LNCS 8365, 2014, pp. 199-214.
Luo et al., "Ciphertext Policy Attribute-Based Proxy Re-encryption", ICICS 2010, LNCS 6476, 2010, pp. 401-415.
Son et al., "A New Outsourcing Conditional Proxy Re-Encryption Suitable for Mobile Cloud Environment", Concurrency Computat.: Pract. Exper., 2016, pp. 1-16.

* cited by examiner

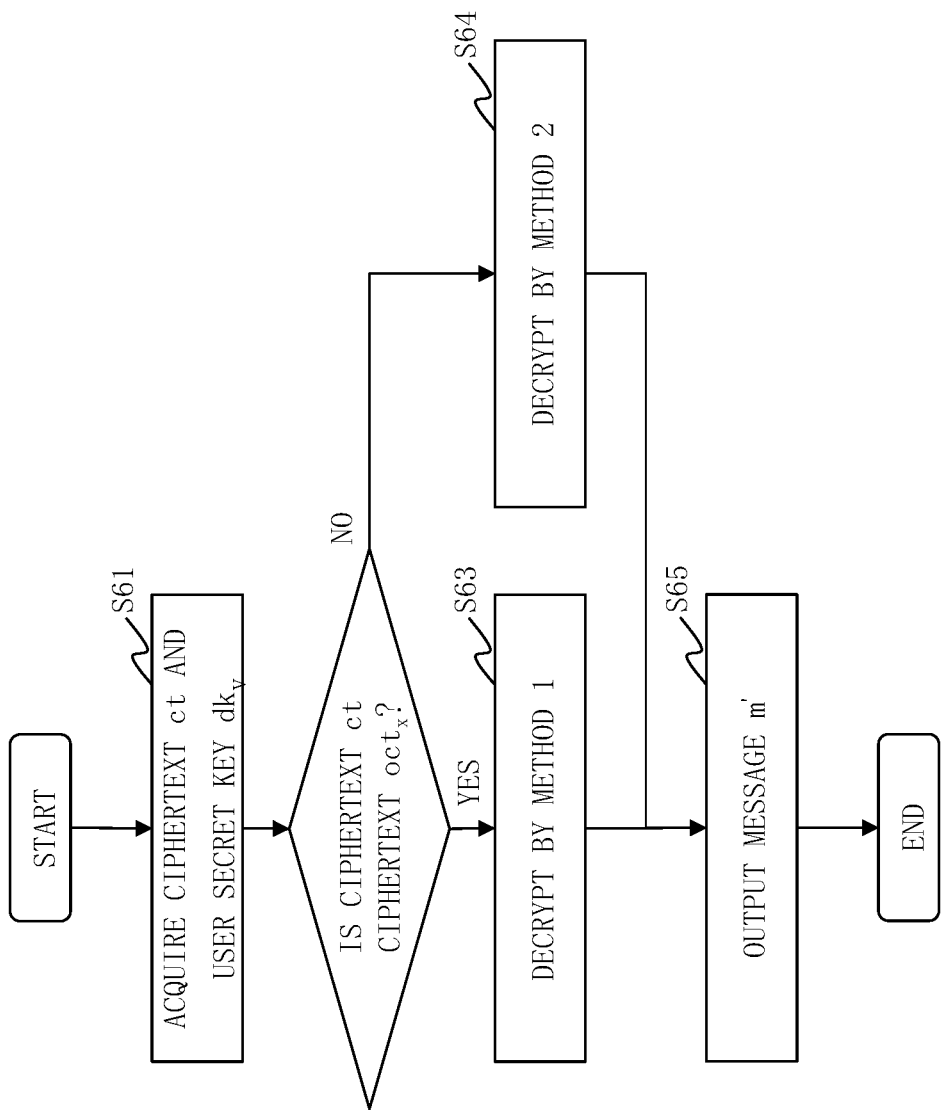

RE-ENCRYPTION DEVICE, METHOD AND COMPUTER READABLE MEDIUM TO CHANGE THE ACCESS RANGE FOR CIPHERTEXT

CROSS REFERENCE TO RELATED APPLICATIONS

This application is a Continuation of PCT International Application No. PCT/JP2019/020718, filed on May 24, 2019, which is hereby expressly incorporated by reference into the present application.

TECHNICAL FIELD

The present invention relates to a re-encryption technique to change an access range for a ciphertext while the ciphertext remains encrypted.

BACKGROUND ART

Proxy re-encryption (PRE) is a technique to transfer decryption authority for a ciphertext to another person without decrypting the ciphertext.

Non-Patent Literature 1 describes an attribute-based PRE (ABPRE) scheme.

CITATION LIST

Non-Patent Literature

Non-Patent Literature 1: Song Luo, Jianbin Hu, and Zhong Chen, "Ciphertext Policy Attribute-Based Proxy Re-encryption"

SUMMARY OF INVENTION

Technical Problem

In the proxy re-encryption scheme described in Non-Patent Literature 1, a secret key of a user or a master public key is required in order to generate a re-encryption key for changing an access range for a ciphertext. In addition, a different re-encryption key needs to be generated for each access range to be changed. Each time a different re-encryption key is generated, the secret key of the user or the master public key, which needs to be managed in secrecy, is used, and this is a problem in terms of security.

It is an object of the present invention to make it possible to realize re-encryption with enhanced security.

Solution to Problem

A re-encryption device according to the present invention includes a re-encryption key generation unit to generate a re-encryption key for re-encrypting a target ciphertext generated by an encryption device, using a master re-encryption key that cannot decrypt a ciphertext generated by the encryption device, but can generate a re-encryption key for changing an access range for a ciphertext generated by the encryption device; and a re-encryption unit to re-encrypt the target ciphertext to generate a re-encrypted ciphertext, using the re-encryption key generated by the re-encryption key generation unit.

Advantageous Effects of Invention

In the present invention, re-encryption is performed using a master re-encryption key that cannot decrypt a ciphertext generated by an encryption device, but can generate a re-encryption key for changing an access range for a ciphertext generated by the encryption device.

Since a re-encryption key for changing an access range for a ciphertext can be generated with the master re-encryption key, a secret key of a user and a master public key are not required for generating a re-encryption key. Therefore, the possibility of leakage of the secret key of the user and the master public key can be reduced, resulting in enhanced security. In addition, a ciphertext cannot be decrypted with the master re-encryption key, so that unauthorized decryption using the master re-encryption key will not be performed, resulting in enhanced security.

BRIEF DESCRIPTION OF DRAWINGS

FIG. 13 is a flowchart illustrating operation of the decryption device 70 according to the first embodiment.

DESCRIPTION OF EMBODIMENTS

First Embodiment

\*\*\*Description of Configurations\*\*\*

Figure 1:
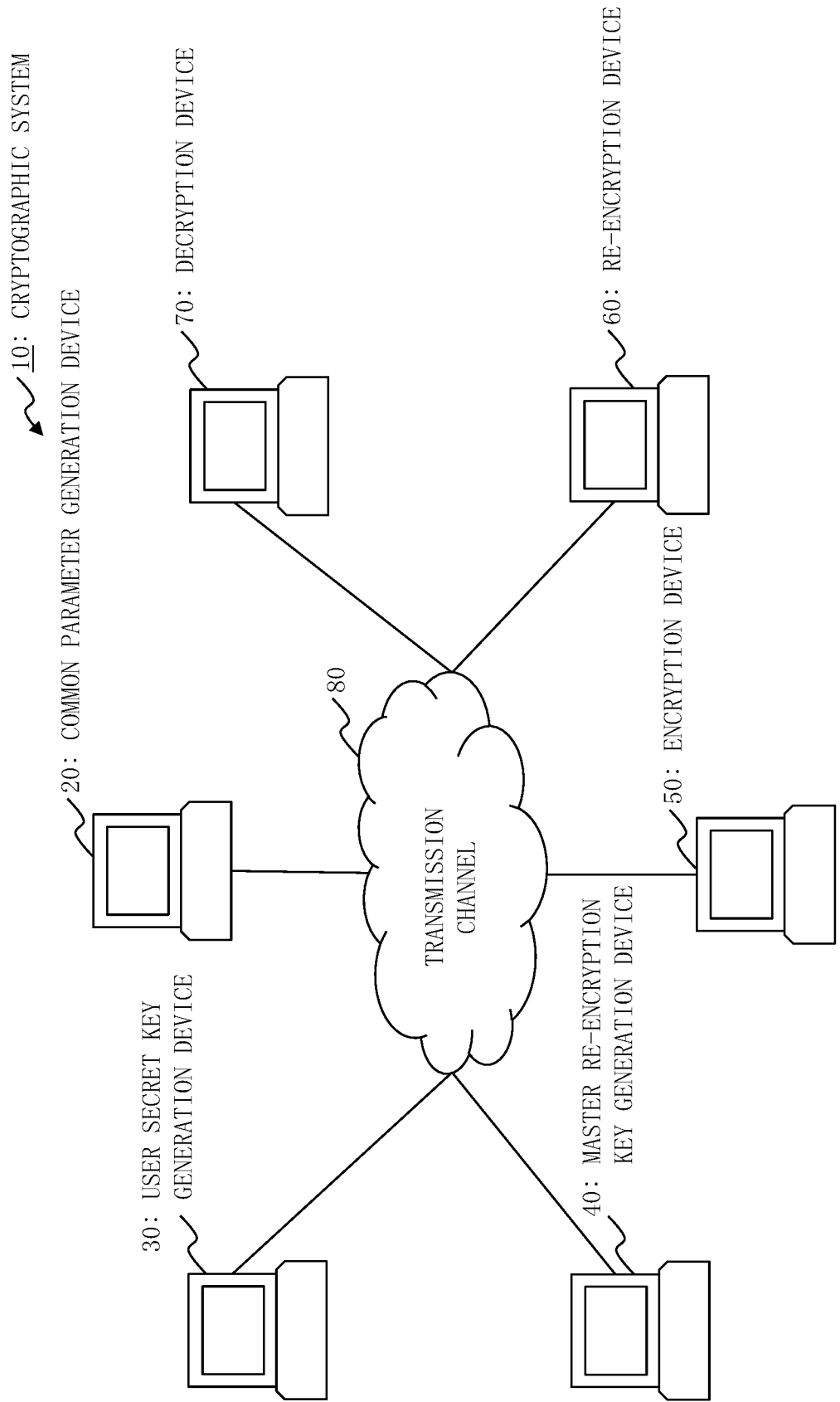
FIG. 1 is a configuration diagram of a cryptographic system 10 according to a first embodiment.

Referring to FIG. 1, a configuration of a cryptographic system 10 according to a first embodiment will be described.

The cryptographic system 10 includes a common parameter generation device 20, user secret key generation devices 30, a master re-encryption key generation device 40, encryption devices 50, a re-encryption device 60, and a decryption device 70.

The common parameter generation device 20, the user secret key generation devices 30, the master re-encryption key generation device 40, and the encryption devices 50, the re-encryption device 60, and the decryption device 70 are connected via a transmission channel 80 such as the Internet or a local area network (LAN).

Figure 2:
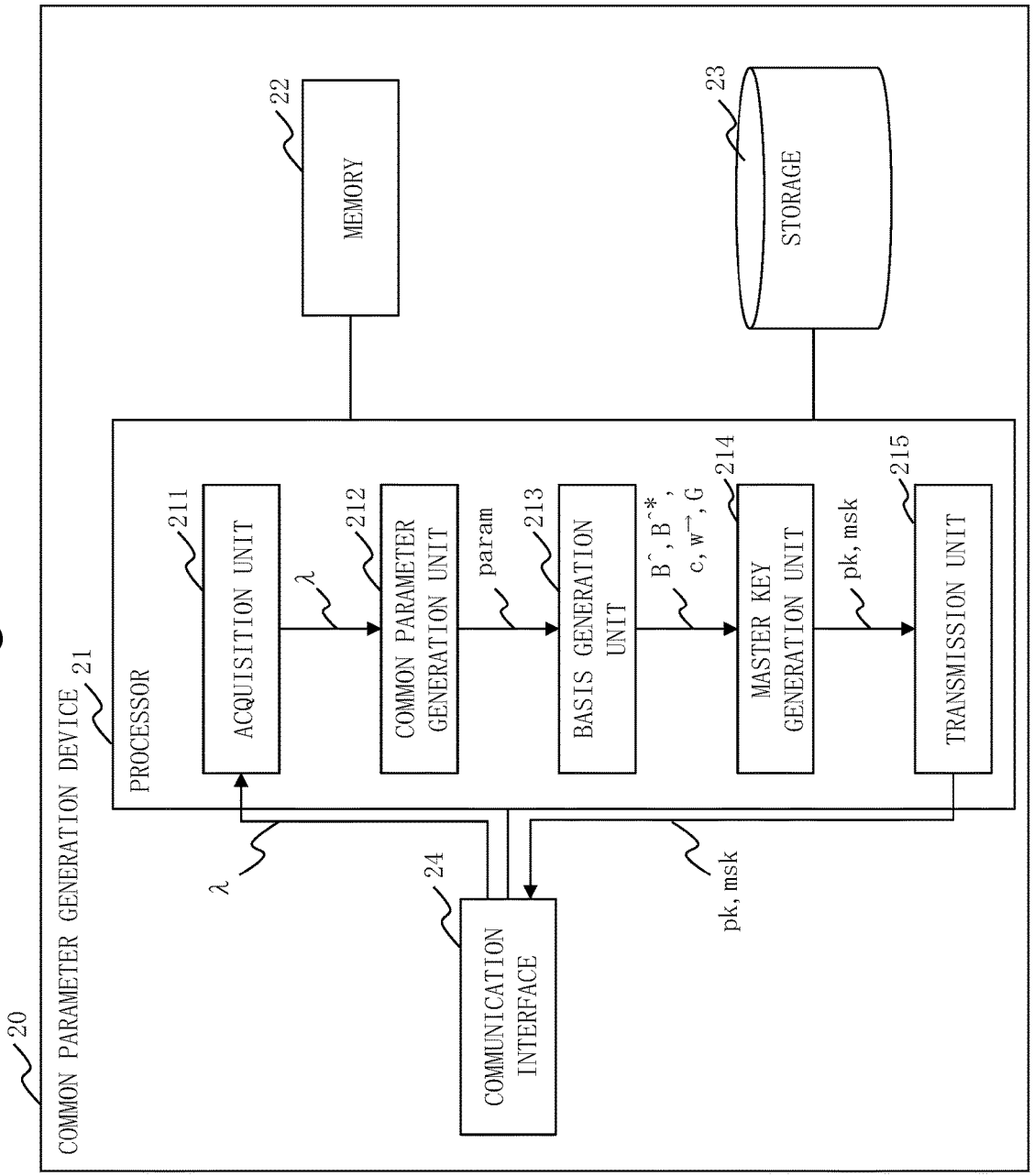
FIG. 2 is a configuration diagram of a common parameter generation device 20 according to the first embodiment.

Referring to FIG. 2, a configuration of the common parameter generation device 20 according to the first embodiment will be described.

The common parameter generation device 20 is a computer such as a server.

The common parameter generation device 20 includes hardware of a processor 21, a memory 22, a storage 23, and a communication interface 24. The processor 21 is connected with the other hardware components via signal lines and controls these other hardware components.

The common parameter generation device 20 includes, as functional components, an acquisition unit 211, a common parameter generation unit 212, a basis generation unit 213, a master key generation unit 214, and a transmission unit 215. The functions of the functional components of the common parameter generation device 20 are realized by software.

The storage 23 stores programs that realize the functions of the functional components of the common parameter generation device 20. These programs are loaded into the memory 22 by the processor 21 and executed by the processor 21. This realizes the functions of the functional components of the common parameter generation device 20.

Figure 3:
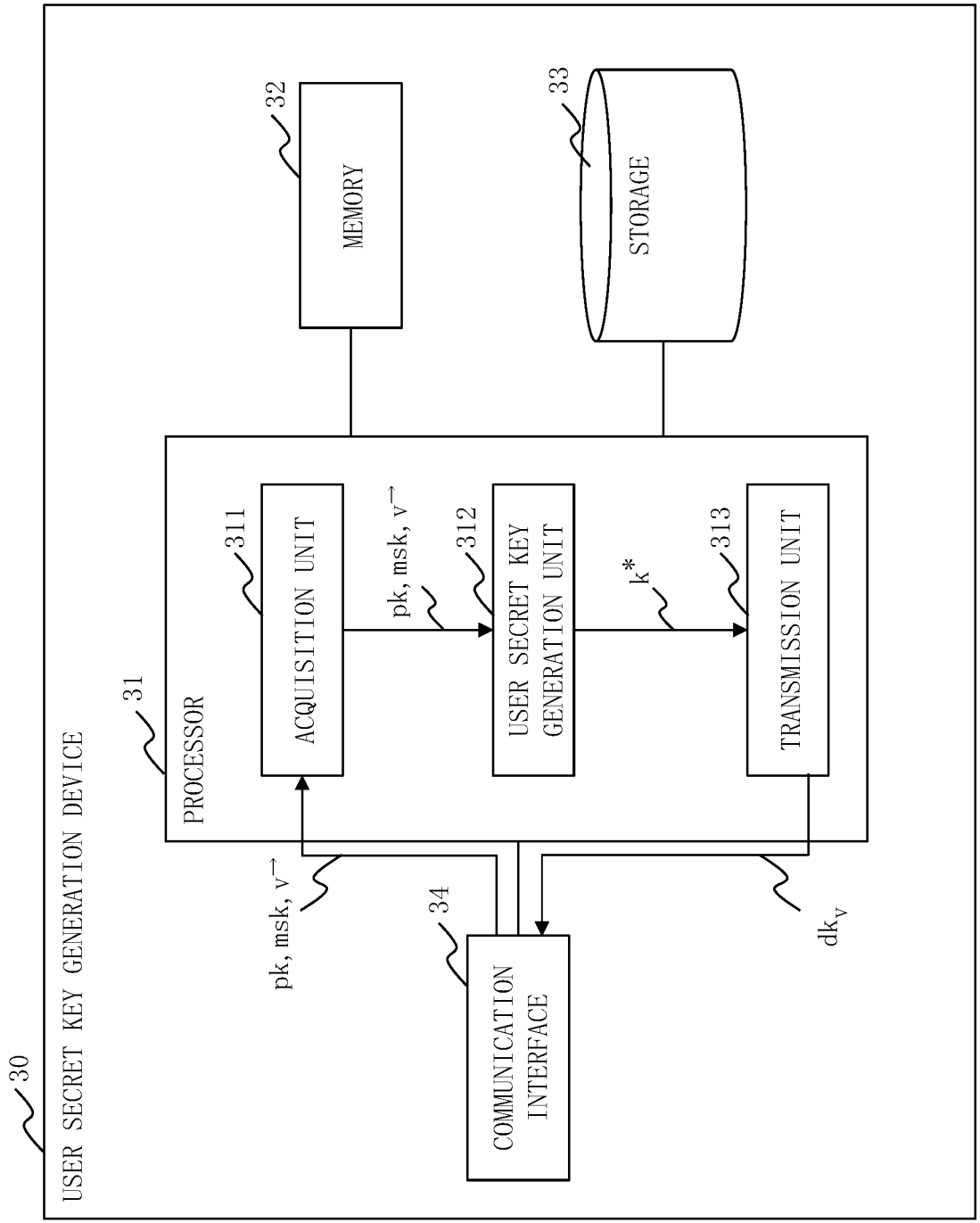
FIG. 3 is a configuration diagram of a user secret key generation device 30 according to the first embodiment.

Referring to FIG. 3, a configuration of the user secret key generation device 30 according to the first embodiment will be described.

The user secret key generation device 30 is a computer such as a personal computer (PC).

The user secret key generation device 30 includes hardware of a processor 31, a memory 32, a storage 33, and a communication interface 34. The processor 31 is connected with the other hardware components via signal lines and controls these other hardware components.

The user secret key generation device 30 includes, as functional components, an acquisition unit 311, a user secret key generation unit 312, and a transmission unit 313. The functions of the functional components of the user secret key generation device 30 are realized by software.

The storage 33 stores programs that realize the functions of the functional components of the user secret key generation device 30. These programs are loaded into the memory 32 by the processor 31 and executed by the processor 31. This realizes the functions of the functional components of the user secret key generation device 30.

Figure 4:
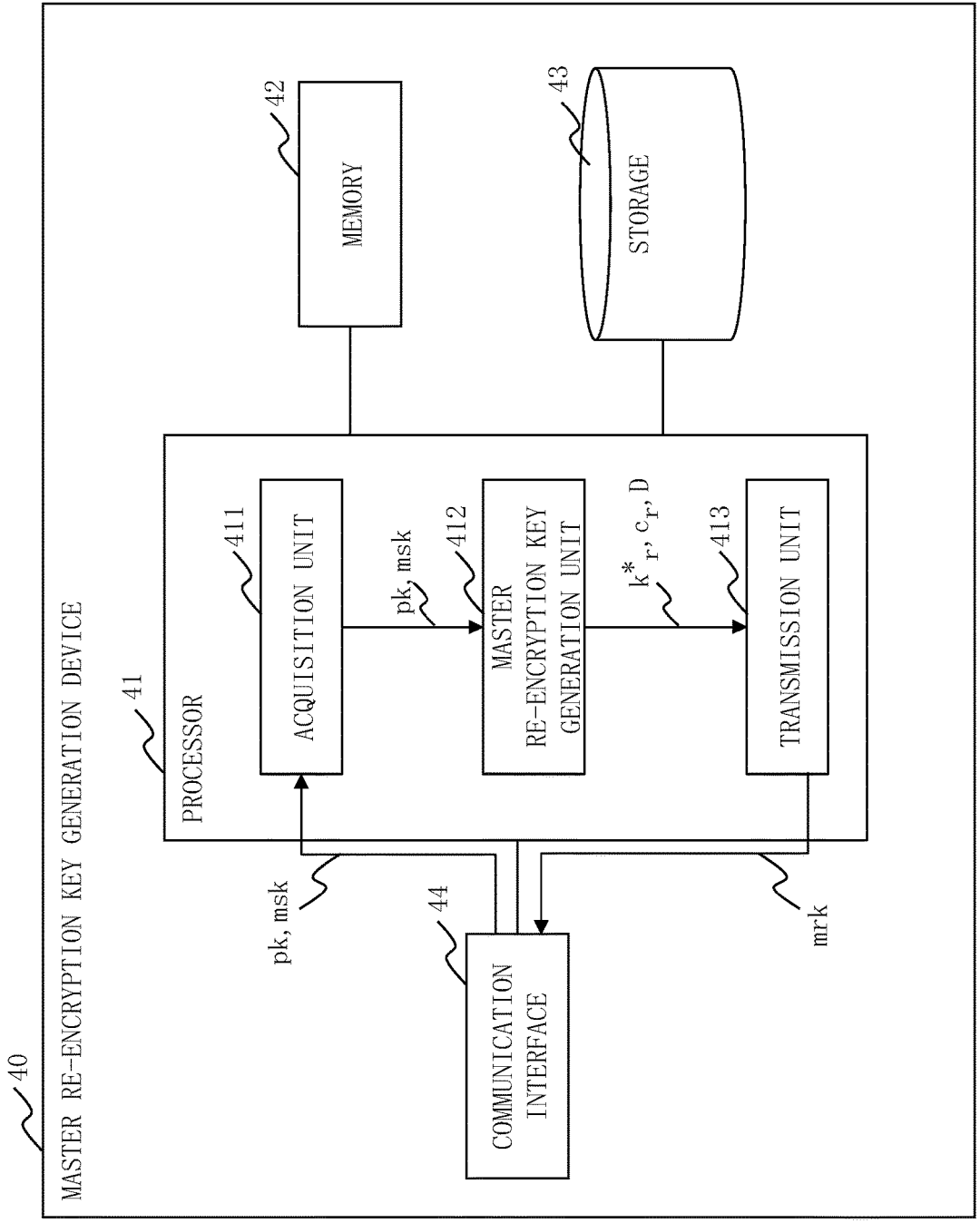
FIG. 4 is a configuration diagram of a master re-encryption key generation device 40 according to the first embodiment.

Referring to FIG. 4, a configuration of the master re-encryption key generation device 40 according to the first embodiment will be described.

The master re-encryption key generation device 40 is a computer such as a server.

The master re-encryption key generation device 40 includes hardware of a processor 41, a memory 42, a storage 43, and a communication interface 44. The processor 41 is connected with the other hardware components via signal lines and controls these other hardware components.

The master re-encryption key generation device 40 includes, as functional components, an acquisition unit 411, a master re-encryption key generation unit 412, and a transmission unit 413. The functions of the functional components of the master re-encryption key generation device 40 are realized by software.

The storage 43 stores programs that realize the functions of the functional components of the master re-encryption key generation device 40. These programs are loaded into the memory 42 by the processor 41 and executed by the processor 41. This realizes the functions of the functional components of the master re-encryption key generation device 40.

Figure 5:
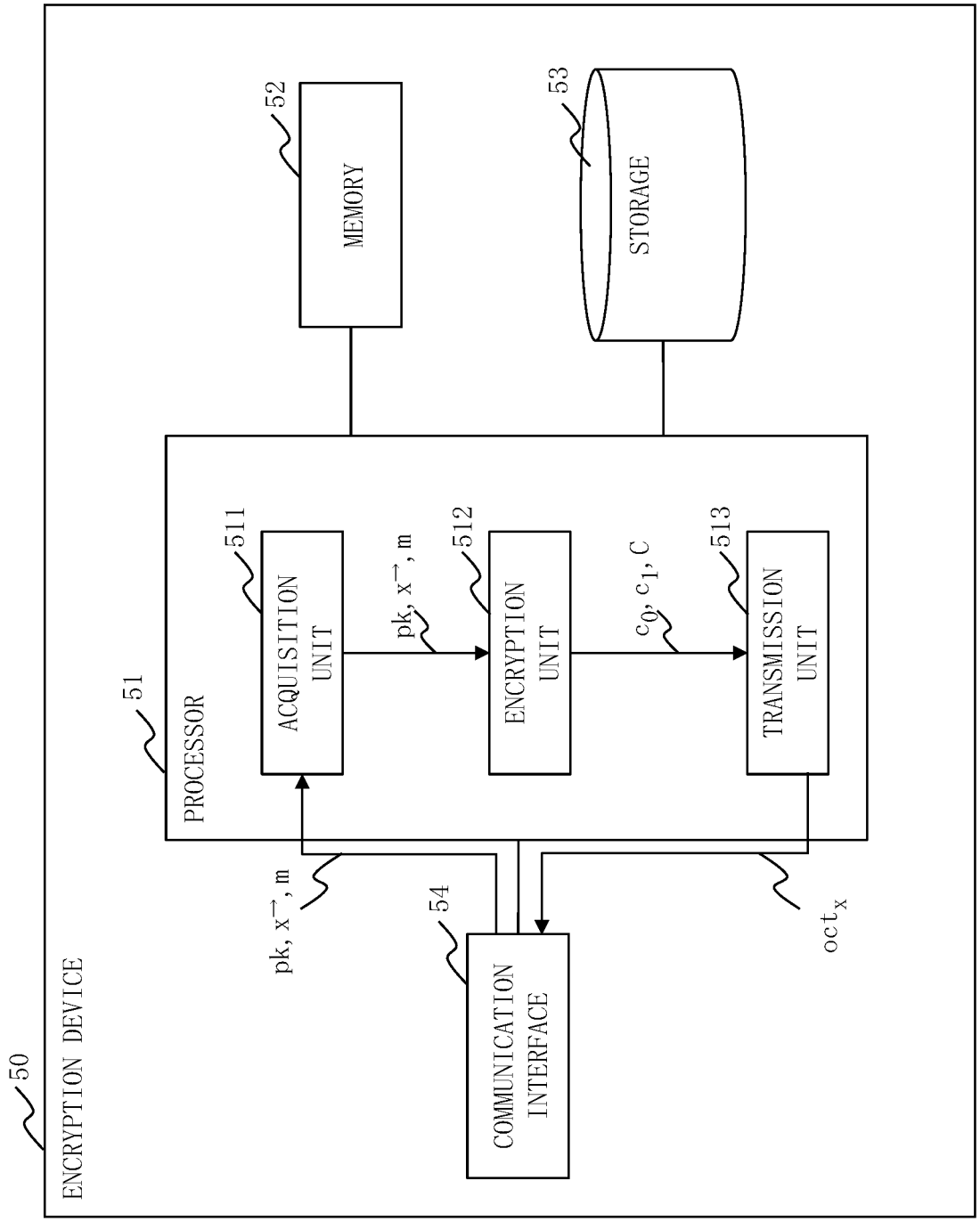
FIG. 5 is a configuration diagram of an encryption device 50 according to the first embodiment.

Referring to FIG. 5, a configuration of the encryption device 50 according to the first embodiment will be described.

The encryption device 50 is a computer such as a PC.

The encryption device 50 includes hardware of a processor 51, a memory 52, a storage 53, and a communication interface 54. The processor 51 is connected with the other hardware components via signal lines and controls these other hardware components.

The encryption device 50 includes, as functional components, an acquisition unit 511, an encryption unit 512, and a transmission unit 513. The functions of the functional components of the encryption device 50 are realized by software.

The storage 53 stores programs that realize the functions of the functional components of the encryption device 50. These programs are loaded into the memory 52 by the processor 51 and executed by the processor 51. This realizes the functions of the functional components of the encryption device 50.

Figure 6:
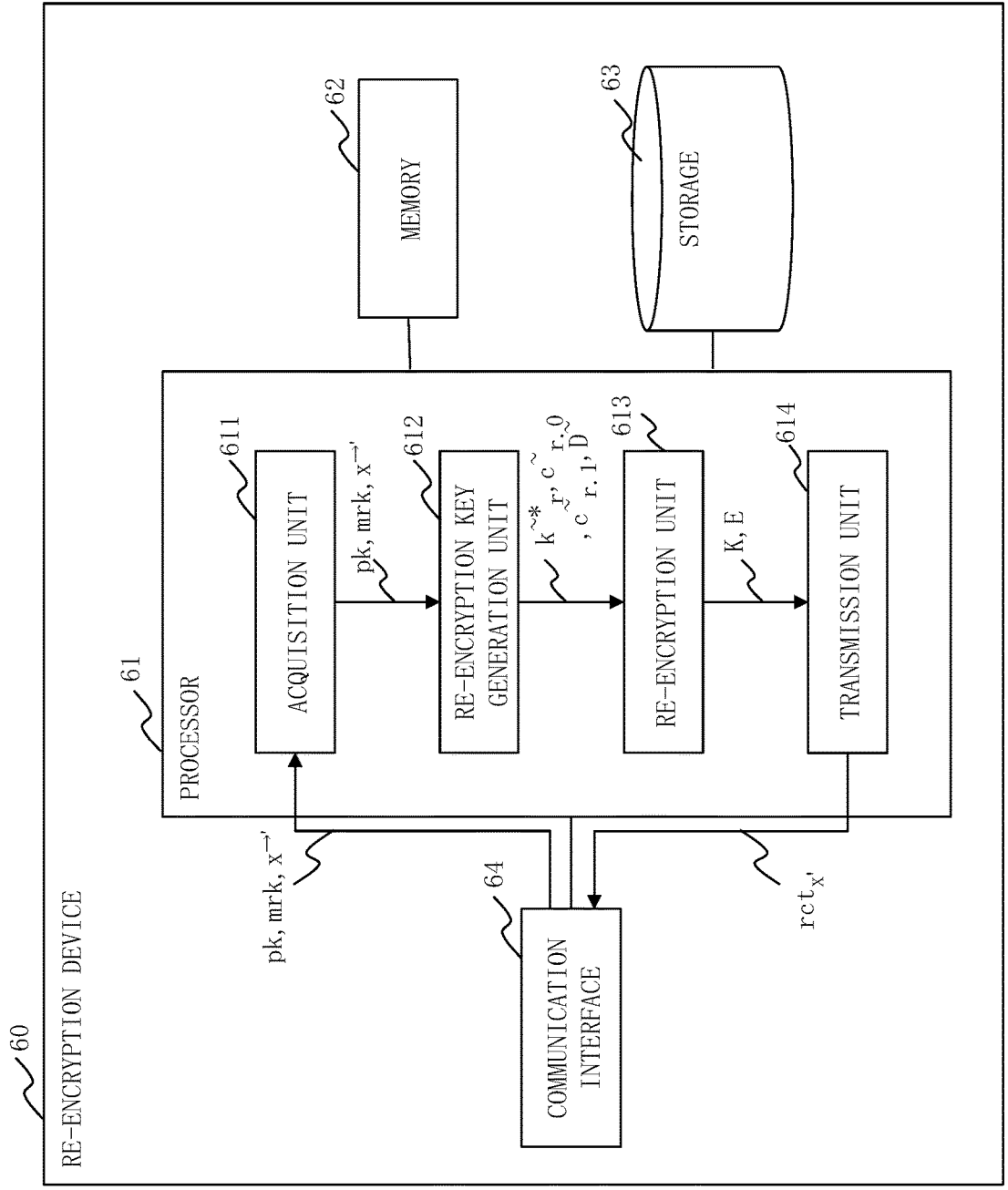
FIG. 6 is a configuration diagram of a re-encryption device 60 according to the first embodiment.

Referring to FIG. 6, a configuration of the re-encryption device 60 according to the first embodiment will be described.

The re-encryption device 60 is a computer such as a server.

The re-encryption device 60 includes hardware of a processor 61, a memory 62, a storage 63, and a communication interface 64. The processor 61 is connected with the other hardware components via signal lines and controls these other hardware components.

The re-encryption device 60 includes, as functional components, an acquisition unit 611, a re-encryption key generation unit 612, a re-encryption unit 613, and a transmission unit 614. The functions of the functional components of the re-encryption device 60 are realized by software.

The storage 63 stores programs that realize the functions of the functional components of the re-encryption device 60. These programs are loaded into the memory 62 by the processor 61 and executed by the processor 61. This realizes the functions of the functional components of the re-encryption device 60.

Figure 7:
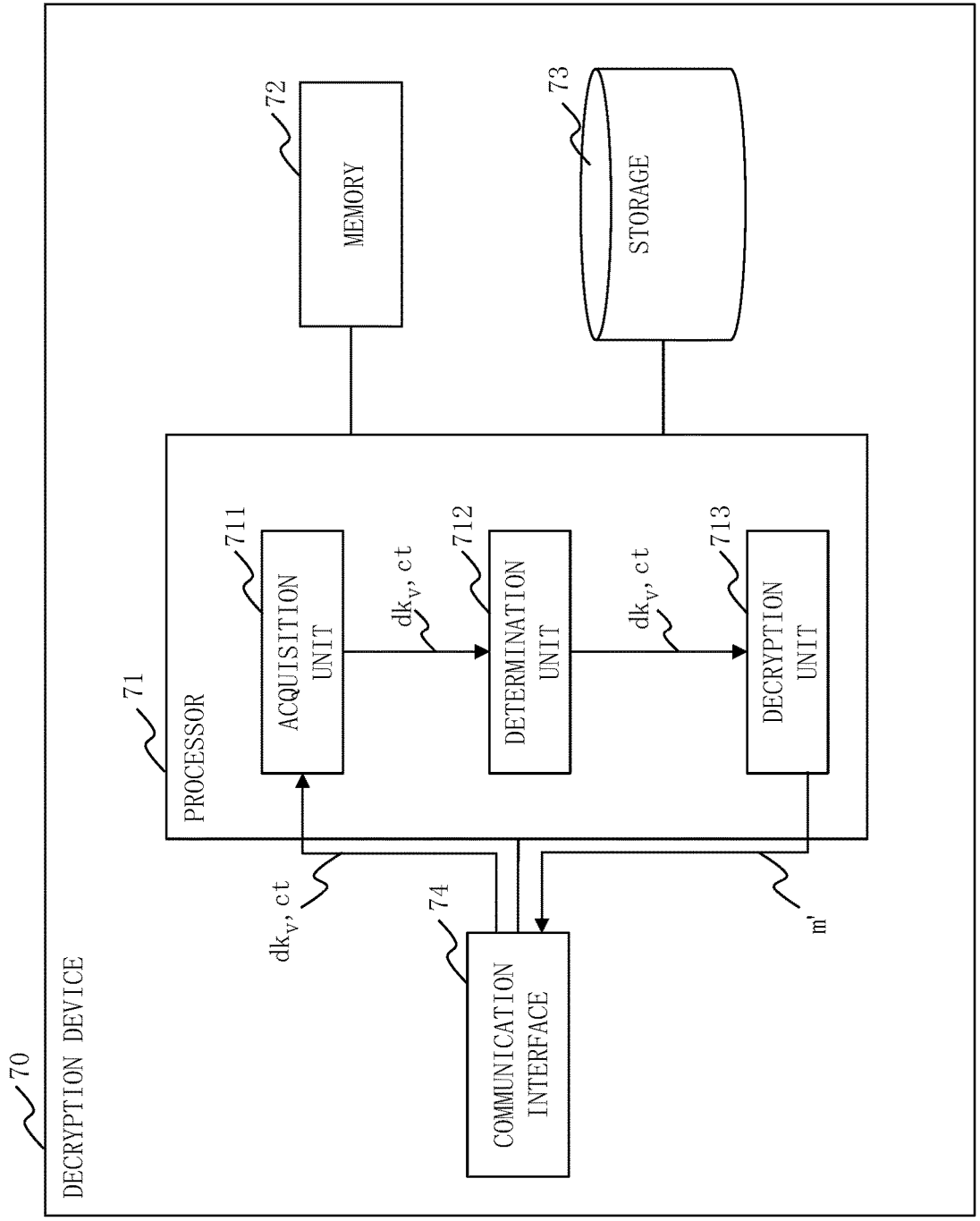
FIG. 7 is a configuration diagram of a decryption device 70 according to the first embodiment.

Referring to FIG. 7, a configuration of the decryption device 70 according to the first embodiment will be described.

The decryption device 70 is a computer such as a server.

The decryption device 70 includes hardware such as a processor 71, a memory 72, a storage 73, and a communication interface 74. The processor 71 is connected with the other hardware components via signal lines and controls these other hardware components.

The decryption device 70 includes, as functional components, an acquisition unit 711, a determination unit 712, and a decryption unit 713. The functions of the functional components of the decryption device 70 are realized by software.

The storage 73 stores programs that realize the functions of the functional components of the decryption device 70. These programs are loaded into the memory 72 by the processor 71 and executed by the processor 71. This realizes the functions of the functional components of the decryption device 70.

Each of the processors 21, 31, 41, 51, 61, and 71 is an integrated circuit (IC) that performs operational processing. Specific examples of each of the processors 21, 31, 41, 51, 61, and 71 are a central processing unit (CPU), a digital signal processor (DSP), and a graphics processing unit (GPU).

Each of the memories 22, 32, 42, 52, 62, and 72 is a storage device to temporarily store data. Specific examples of each of the memories 22, 32, 42, 52, 62, and 72 are a static random access memory (SRAM) and a dynamic random access memory (DRAM).

Each of the storages 23, 33, 43, 53, 63, and 73 is a storage device to store data. A specific example of each of the storages 23, 33, 43, 53, 63, and 73 is a hard disk drive (HDD). Alternatively, each of the storages 23, 33, 43, 53, 63, and 73 may be a portable storage medium such as a Secure Digital (SD, registered trademark) memory card, CompactFlash (CF, registered trademark), a NAND flash, a flexible disk, an optical disc, a compact disc, a Blu-ray (registered trademark) disc, or a digital versatile disc (DVD).

Each of the communication interfaces 24, 34, 44, 54, 64, and 74 is an interface for communicating with external devices. Specific examples of each of the communication interfaces 24, 34, 44, 54, 64, and 74 is an Ethernet (registered trademark) port, a Universal Serial Bus (USB) port, and a High-Definition Multimedia Interface (HDMI) port.

FIG. 2 illustrates only one processor 21. However, the common parameter generation device 20 may include a plurality of processors as an alternative to the processor 21. Similarly, the user secret key generation device 30 may include a plurality of processors as an alternative to the processor 31. The master re-encryption key generation device 40 may include a plurality of processors as an alternative to the processor 41. The encryption device 50 may include a plurality of processors as an alternative to the processor 51. The re-encryption device 60 may include a plurality of processors as an alternative to the processor 61. The decryption device 70 may include a plurality of processors as an alternative to the processor 71.

The plurality of processors share execution of the programs that realize the functions of the respective functional components. Each of the processors is, like the processors 21, 31, 41, 51, 61, and 71, an IC that performs operational processing.

\*\*\*Description of Operation\*\*\*

Referring to FIGS. 8 to 13, operation of the cryptographic system 10 according to the first embodiment will be described.

\*\*Notations\*\*

Notations to be used in the description of the operation of the cryptographic system 10 will be described.

When A is a random variable or distribution, Formula 101 denotes that y is randomly selected from A according to the distribution of A. That is, y is a random number in Formula 101.

$$y \xleftarrow{R} A \qquad \text{[Formula 101]}$$

When A is a set, Formula 102 denotes that y is uniformly selected from A. That is, y is a uniform random number in Formula 102.

$$y \xleftarrow{U} A \qquad \text{[Formula 102]}$$

Formula 103 denotes that y is a set defined by z, or y is a set substituted by z.

$$y := z \qquad \text{[Formula 103]}$$

When $\underline{a}$ is a constant, Formula 104 denotes that a machine (algorithm) A outputs $\underline{a}$ on input x.

$$A(x) \to \underline{a} \qquad \text{[Formula 104]}$$

for example, $$A(x) \to 1$$

Formula 105, that is $\mathbb{F}_q$, denotes a finite field of order q.

$$\mathbb{F}_q \qquad \text{[Formula 105]}$$

A vector representation denotes a vector representation in the finite field $\mathbb{F}_q$. That is, it is as indicated in Formula 106. Note that n written as a superscript in the finite field $\mathbb{F}_q$ indicates the number of elements in the vector.

$\vec{x}$ denotes $$(x_1, \ldots, x_n) \in \mathbb{F}_q^n. \qquad \text{[Formula 106]}$$

Formula 107 denotes the inner-product, indicated in Formula 109, of two vectors $\vec{x}$ and $\vec{v}$ indicated in Formula 108.

$$\vec{x} \cdot \vec{v} \qquad \text{[Formula 107]}$$

$$\vec{x} = (x_1, \ldots, x_n), \qquad \text{[Formula 108]}$$

$$\vec{v} = (v_1, \ldots, v_n)$$

$$\sum_{i=1}^{n} x_i v_i \qquad \text{[Formula 109]}$$

Note that $X^T$ denotes the transpose of a matrix X.

For a basis B and a basis B* indicated in Formula 110, Formula 111 is established.

$$\mathbb{B} := (b_1, \ldots b_N), \qquad \text{[Formula 110]}$$

$$\mathbb{B}^* := (b_1^*, \ldots b_N^*)$$

$$(x_1, \ldots, x_N)_{\mathbb{B}} := \sum_{i=1}^{N} x_i b_i, \qquad \text{[Formula 111]}$$

$$(y_1, \ldots, y_N)_{\mathbb{B}^*} := \sum_{i=1}^{N} y_i b_i^*$$

\*\*Dual Pairing Vector Spaces\*\*

The cryptographic system 10 realizes a proxy re-encryption scheme using dual pairing vector spaces.

First, symmetric bilinear pairing groups will be described.

Symmetric bilinear pairing groups (q, G, $G_T$, g, e) are a tuple of a prime q, a cyclic additive group G of order q, a cyclic multiplicative group $G_T$ of order q, g≠0∈G, and a polynomial-time computable nondegenerate bilinear pairing e: G×G→$G_T$. The nondegenerate bilinear pairing signifies e(sg, tg)=e(f, g)$^{st}$, and e(g, g)≠1.

In the following description, let $G_{bpg}$ be an algorithm that takes as input $1^\lambda$, and outputs values of a parameter param$_G$:=(q, G, $G_T$, g, e) of bilinear pairing groups with a security parameter λ.

Next, dual pairing vector spaces will be described.

Dual pairing vector spaces (q, V, $G_T$, A, e) can be constructed by a direct product of the symmetric bilinear pairing groups (param$_G$:=(q, G, $G_T$, g, e)). The dual pairing vector spaces (q, V, $G_T$, A, e) are a tuple of a prime q, an N-dimensional vector space V over $\mathbb{F}_q$ indicated in Formula 112, a cyclic group $G_T$ of order q, and a canonical basis A:=($a_1$, . . . $a_N$) of the space V, and have the following operations (1) and (2). Note that $a_i$ is as indicated in Formula 113.

$$\mathbb{V} := \overbrace{\mathbb{G} \times \ldots \times \mathbb{G}}^{N}$$ [Formula 112]

$$a_i := \left(0, \overset{i-1}{\ldots}, 0, g, 0, \overset{N-i}{\ldots}, 0\right)$$ [Formula 113]

Operation (1): Nondegenerate Bilinear Pairing
A pairing on the space V is defined by Formula 114.

$$e(x, y) := \prod_{i=1}^{N} e(G_i, H_i) \in \mathbb{G}_T$$ [Formula 114]

where $(G_1, \ldots, G_N) := x \in \mathbb{V}$, $(H_1, \ldots, H_N) := y \in \mathbb{V}$.

This is nondegenerate bilinear, that is, $e(sx, ty)=e(x, y)^{st}$ and if $e(x, y)=1$ for all $y \in V$, then $x=0$. For all i and j, $e(a_i, a_j)=e(g, g)^{\delta_{i,j}}$, where $\delta_{i,j}=1$ if $i=j$, and $\delta_{i,j}=0$ if $i \neq j$, and $e(g, g) \neq 1 \in G_T$.

Operation (2): Distortion Maps
Linear transformations $\varphi_{i,j}$ on the space V indicated in Formula 115 can achieve Formula 116.

If $\phi_{i,j}(a_j) = a_i$ and [Formula 115]

$k \neq j$, then $\phi_{i,j}(a_k) = 0$.

$$\phi_{i,j}(x) := \left(0, \overset{i-1}{\ldots}, 0, g_j, 0, \overset{N-i}{\ldots}, 0\right)$$ [Formula 116]

where $(g_1, \ldots g_N) := x$.

The linear transformations $\varphi i,j$ will be called distortion maps.

In the following description, let $G_{dpvs}$ be an algorithm that takes as input $1^\lambda$ ($\lambda \in$ natural numbers), $N \in$ natural numbers, and the values of the parameter $param_G:=(q, G, G_T, g, e)$ of bilinear pairing groups, and outputs values of a parameter $param_V:=(q, V, G_T, A, e)$ of dual pairing vector spaces of the N-dimensional vector space V with the security parameter $\lambda$.

A case in which dual pairing vector spaces are constructed with the symmetric bilinear pairing groups described above will be described here. Dual pairing vector spaces can also be constructed with asymmetric bilinear pairing groups. The following description can be readily applied to a case in which dual pairing vector spaces are constructed with asymmetric bilinear pairing groups.

Operation of Common Parameter Generation Device 20

Figure 8:
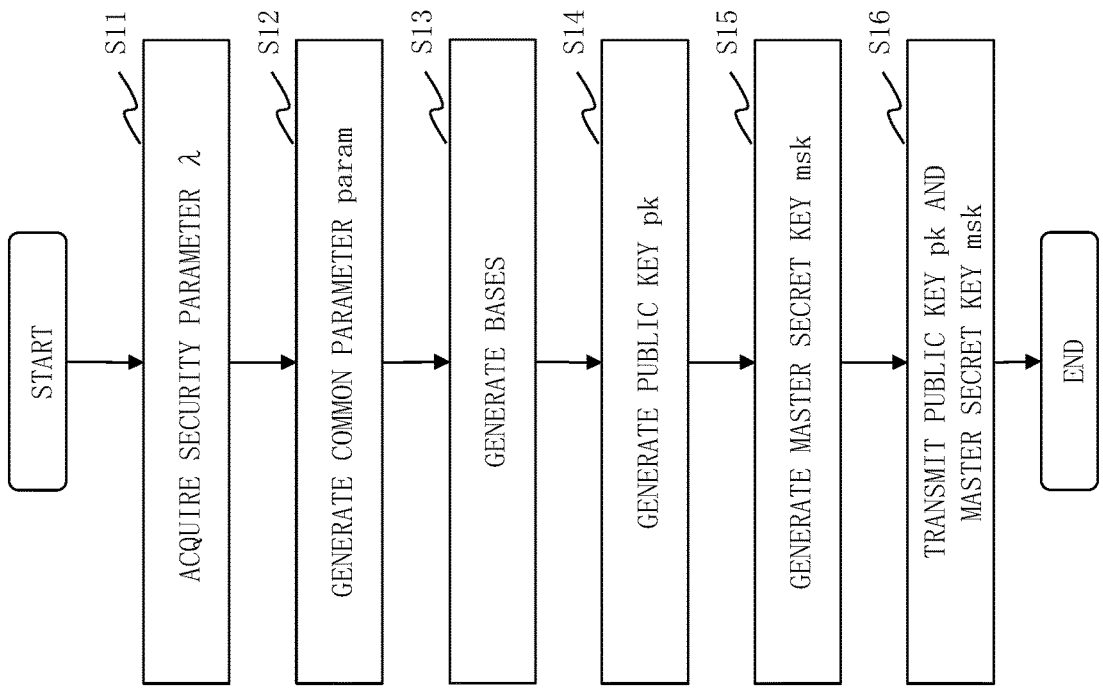
FIG. 8 is a flowchart illustrating operation of the common parameter generation device 20 according to the first embodiment.

Referring to FIG. 8, operation of the common parameter generation device 20 according to the first embodiment will be described.

A procedure for the operation of the common parameter generation device 20 according to the first embodiment is equivalent to a common parameter generation method according to the first embodiment. A program that realizes the operation of the common parameter generation device 20 according to the first embodiment is equivalent to a common parameter generation program according to the first embodiment.

The common parameter generation device 20 generates a public key pk and a master secret key msk to be used in the cryptographic system 10. The common parameter generation device 20 transmits the public key pk to the user secret key generation device 30, the master re-encryption key generation device 40, and each of the encryption devices 50 via the transmission channel 80. The common parameter generation device 20 transmits the master secret key msk in secrecy to the user secret key generation device 30 and the master re-encryption key generation device 40 via the transmission channel 80. To transmit in secrecy means to transmit after encryption by an existing encryption scheme, for example, so as to be concealed from third parties. The public key pk and the master secret key msk may be transmitted by a method such as postal mail, instead of being transmitted via the transmission channel 80.

(Step S11: Acquisition Process)
The acquisition unit 211 acquires a security parameter $\lambda$ indicating a key length.

Specifically, the acquisition unit 211 accepts the security parameter $\lambda$ that is input by an administrator of the cryptographic system 10. The acquisition unit 211 writes the security parameter $\lambda$ in the memory 22.

(Step S12: Common Parameter Generation Process)
The common parameter generation unit 212 generates a parameter $param_V:=(q, V, G_T, A, e)$ of dual pairing vector spaces by the algorithm $G_{dpvs}$ described above, taking as input the security parameter $\lambda$ acquired in step S11. Specifically, the common parameter generation unit 212 generates the parameter $param_V$, as indicated in Formula 117.

$$param_\mathbb{V} := (q, \mathbb{V}, \mathbb{G}_T, \mathbb{A}, e) \xleftarrow{R} G_{dpvs}(1^\lambda, 3n+2)$$ [Formula 117]

The common parameter generation unit 212 generates an element $g_T$, as indicated in Formula 118.

$$\psi \xleftarrow{U} \mathbb{F}_q^\times, \; g_T := e(g, g)^\psi$$ [Formula 118]

Then, the common parameter generation unit 212 generates a common parameter param in which the parameter $param_V$ and the element $g_T$ are set. The common parameter generation unit 212 writes the common parameter param in the memory 22.

(Step S13: Basis Generation Process)
The basis generation unit 213 generates a basis $\hat{B}_u$ and a basis $\hat{B}^*_u$ for each integer u of $u=0, 1$, using the parameter $param_V$ generated in step S12. Specifically, the basis generation unit 213 generates the basis $\hat{B}_u$ and the basis $\hat{B}^*_u$ for each integer u of $u=0, 1$, as indicated in Formula 119.

for $u = 0, 1$ [Formula 119]

$X_u := (\chi_{u,i,j}) \xleftarrow{U} GL(3n+2, \mathbb{F}_q)$, $(\nu_{u,i,j}) := \psi \cdot (X_u^T)^{-1}$, $b_{u,i} := \sum_{j=1}^{3n+2} \chi_{u,i,j} a_j, \; \mathbb{B}_u := (b_{u,0}, \ldots, b_{u,3n+1})$, $b^*_{u,i} := \sum_{j=1}^{3n+2} \nu_{u,i,j} a_j, \; \mathbb{B}^*_u := (b^*_{u,0}, \ldots, b^*_{u,3n+1})$, $\hat{\mathbb{B}}_u := (b_{u,0}, \ldots, b_{u,u+2}, b_{u,3n+1})$, $\hat{\mathbb{B}}^*_u := (b^*_{u,1}, \ldots, b^*_{u,u+2}, b^*_{u,2n+2}, \ldots, b^*_{u,3n})$ The basis generation unit 213 generates an element c in which a parameter $\vec{y}:=(y_1, \ldots, y_n)$ is set, using the basis $\hat{B}_u$, as indicated in Formula 120.

$$\vec{y} := (y_1, \ldots, y_n) \xleftarrow{U} \mathbb{F}_q^n, \omega, \varphi \xleftarrow{U} \mathbb{F}_q,$$
$$c := (0, \omega\vec{y}, 0^n, 0^n, \varphi)_{\mathbb{B}_1}$$

[Formula 120]

The basis generation unit 213 generates a parameter $\vec{w}:=(w_1, \ldots, w_n)$, as indicated in Formula 121.

$$\vec{w} := (w_1, \ldots, w_n) \xleftarrow{U} \mathbb{F}_q^n, \text{ such that } \vec{y} \cdot \vec{w} = 0$$

[Formula 121]

The basis generation unit 213 generates an encode function G indicated in Formula 122.

$$G : \mathbb{G}_T \to \mathbb{F}_q$$

[Formula 122]

The basis generation unit 213 writes the basis $\hat{B}_u$, the basis $\hat{B}^*_u$, the element c, the parameter $\vec{w}$, and the encode function G in the memory 22.

(Step S14: Public Key Generation Process)

The master key generation unit 214 generates a public key pk in which the security parameter λ, the common parameter param, the basis $\hat{B}_0$, the basis $\hat{B}^*_0$, a basis vector $b_{1,0}$, a basis vector $b_{1,3n+2}$, the element c, and the encode function G are set. That is, pk:=(λ, param, $\hat{B}_0$, $\hat{B}^*_0$, $b_{1,0}$, $b_{1,3n+2}$, c, G).

(Step S15: Master Secret Key Generation Process)

The master key generation unit 214 generates a master secret key msk in which a basis vector $b^*_{0,0}$, a basis vector $b^*_{0,1}$, the basis $\hat{B}^*_1$, and the parameter $\vec{w}$ are set. That is, msk:=($b^*_{0,0}$, $b^*_{0,1}$, $\hat{B}^*_1$, $\vec{w}$).

(Step S16: Transmission Process)

The transmission unit 215 transmits the public key pk to the user secret key generation device 30, the master re-encryption key generation device 40, and each of the encryption devices 50 via the transmission channel 80. The transmission unit 215 transmits the master secret key msk in secrecy to the user secret key generation device 30 and the master re-encryption key generation device 40 via the transmission channel 80.

Operation of User Secret Key Generation Device 30

Figure 9:
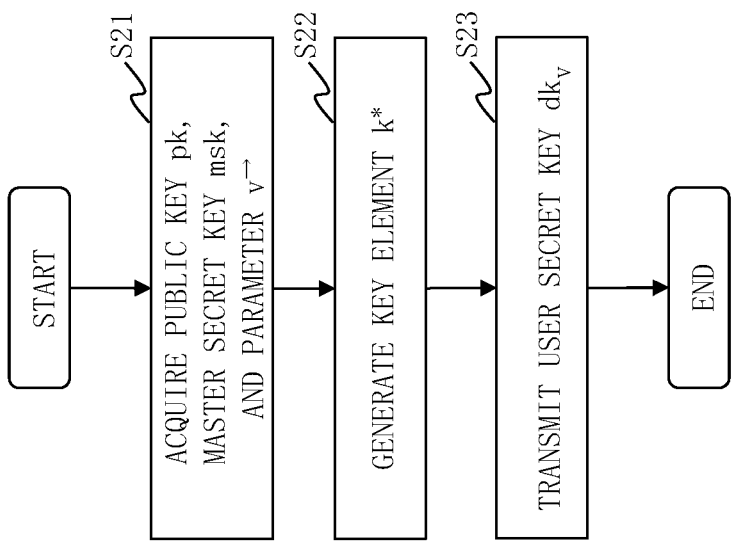
FIG. 9 is a flowchart illustrating operation of the user secret key generation device 30 according to the first embodiment.

Referring to FIG. 9, operation of the user secret key generation device 30 according to the first embodiment will be described.

A procedure for the operation of the user secret key generation device 30 according to the first embodiment is equivalent to a user secret key generation method according to the first embodiment. A program that realizes the operation of the user secret key generation device 30 according to the first embodiment is equivalent to a user secret key generation program according to the first embodiment.

The user secret key generation device 30 generates a user secret key $dk_v$, based on the public key pk and the master secret key msk. The user secret key generation device 30 transmits the user secret key $dk_v$ in secrecy to the re-encryption device 60 and the decryption device 70 via the transmission channel 80.

The user secret key $dk_v$ may be transmitted by a method such as postal mail, instead of being transmitted via the transmission channel 80.

(Step S21: Acquisition Process)

The acquisition unit 311 acquires the public key pk and the master secret key msk that are transmitted by the common parameter generation device 20. The acquisition unit 311 writes the public key pk and the master secret key msk in the memory 32.

The acquisition unit 311 acquires a parameter $\vec{v}:= (v_1, \ldots, v_n)$. Specifically, the acquisition unit 311 accepts the parameter $\vec{v}$ that is input by an administrator of the user secret key generation device 30. The acquisition unit 311 writes the parameter $\vec{v}$ in the memory 32. The parameter $\vec{v}$ indicates attributes or the like of a user who uses the user secret key $dk_v$.

(Step S22: User Secret Key Generation Process)

The user secret key generation unit 312 generates random numbers, as indicated in Formula 123.

$$\vec{\eta} \xleftarrow{U} \mathbb{F}_q^n, \delta \xleftarrow{U} \mathbb{F}_q$$

[Formula 123]

The user secret key generation unit 312 generates a key element k*, as indicated in Formula 124.

$$k^* := (1, \delta\vec{v}, 0^n, \vec{\eta}, 0)_{\mathbb{B}^*_0}$$

[Formula 124]

The user secret key generation unit 312 writes the key element k* in the memory 32.

(Step S23: Transmission Process)

The transmission unit 313 transmits the user secret key $dk_v$, in which the parameter $\vec{v}$ and the key element k* are set to the decryption device 70 in secrecy via the transmission channel 80.

Operation of Master Re-encryption Key Generation Device 40

Figure 10:
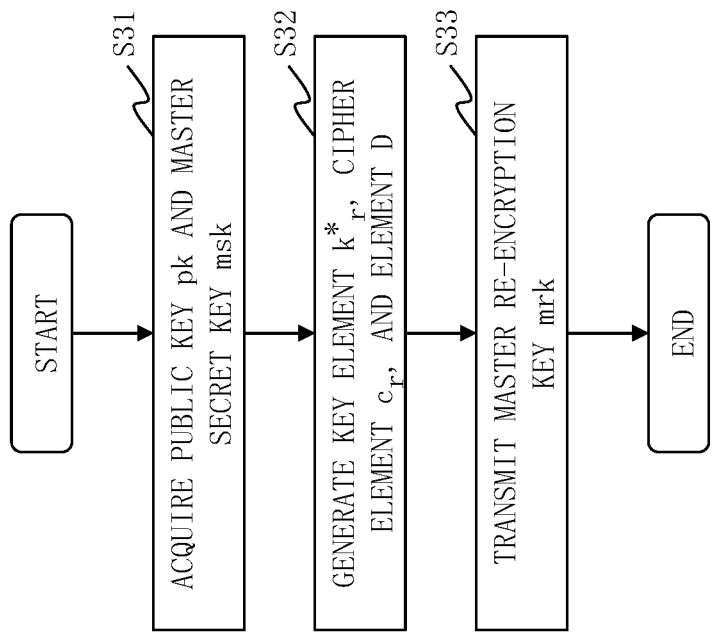
FIG. 10 is a flowchart illustrating operation of the master re-encryption key generation device 40 according to the first embodiment.

Referring to FIG. 10, operation of the master re-encryption key generation device 40 according to the first embodiment will be described.

A procedure for the operation of the master re-encryption key generation device 40 according to the first embodiment is equivalent to a master re-encryption key generation method according to the first embodiment. A program that realizes the operation of the master re-encryption key generation device 40 according to the first embodiment is equivalent to a master re-encryption key generation program according to the first embodiment.

The master re-encryption key generation device 40 generates a master re-encryption key mrk, based on the public key pk and the master secret key msk. The master re-encryption key generation device 40 transmits the master re-encryption key mrk to the re-encryption device 60 in secrecy via the transmission channel 80.

The master re-encryption key mrk may be transmitted by a method such as postal mail, instead of being transmitted via the transmission channel 80.

(Step S31: Acquisition Process)

The acquisition unit 411 acquires the public key pk and the master secret key msk that are transmitted by the common parameter generation device 20. The acquisition unit 311 writes the public key pk and the master secret key msk in the memory 32.

(Step S32: Master Re-Encryption Key Generation Process)

The master re-encryption key generation unit 412 generates random numbers, as indicated in Formula 125.

$$\vec{\eta}_r \xleftarrow{U} \mathbb{F}_q^n, r, \varsigma_r, \varphi_r, \delta_r \xleftarrow{U} \mathbb{F}_q \quad \text{[Formula 125]}$$

The master re-encryption key generation unit 412 generates a key element $k^*_r$, a cipher element $c_r$, and an element D, as indicated in Formula 126. The parameter $\vec{w}$ is set in the key element $k^*_r$, as indicated in Formula 126. The parameter $\vec{w}$ corresponds to a parameter $\vec{y}$ set in a cipher element $c_1$ included in a ciphertext generated by the encryption device 50 to be described later.

$$k^*_r := (r, \delta_r \vec{w}, 0^n, \vec{n}_r, 0)_{\mathbb{B}_1^*},$$

$$c_r := (\varsigma_r, 0^n, 0^n, 0^n, \varphi_r)_{\mathbb{B}_0},$$

$$D := G(g_T, \varsigma_r) \cdot r \in \mathbb{F}_q \quad \text{[Formula 126]}$$

The master re-encryption key generation unit 412 writes the key element $k^*_r$, the cipher element $c_r$, and the element D in the memory 42.

(Step S33: Transmission Process)

The transmission unit 413 transmits the master re-encryption key mrk in which the key element $k^*_r$, the cipher element $c_r$, the element D, and the basis $\hat{B}^*_1$ are set to the re-encryption device 60 in secrecy via the transmission channel 80.

Operation of Encryption Device 50

Figure 11:
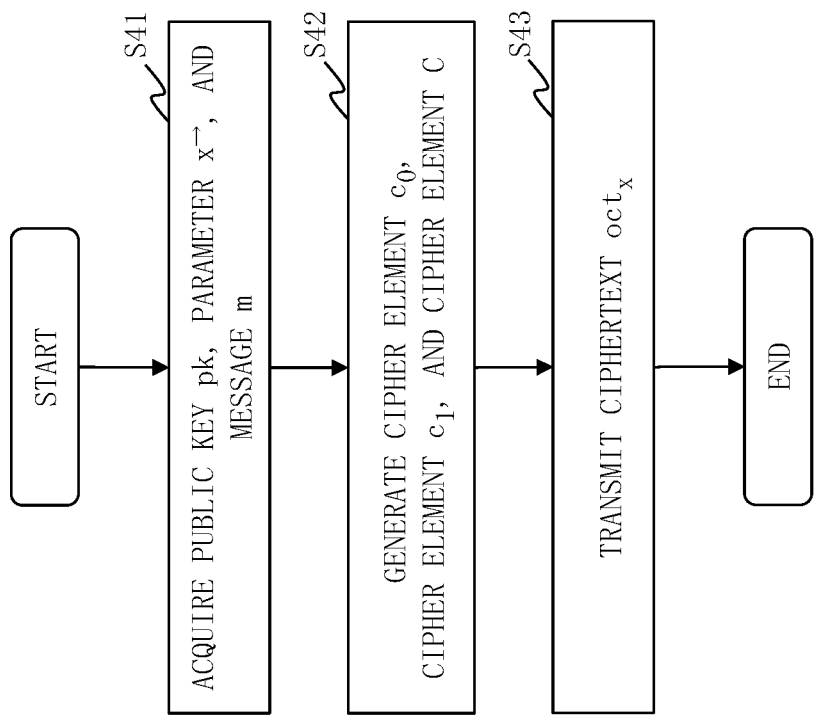
FIG. 11 is a flowchart illustrating operation of the encryption device 50 according to the first embodiment.

Referring to FIG. 11, operation of the encryption device 50 according to the first embodiment will be described.

A procedure for the operation of the encryption device 50 according to the first embodiment is equivalent to an encryption method according to the first embodiment. A program that realizes the operation of the encryption device 50 according to the first embodiment is equivalent to an encryption program according to the first embodiment.

The encryption device 50 generates a ciphertext $oct_x$ in which an access range x is set and a message m is encrypted, based on the public key pk. The encryption device 50 transmits the ciphertext $oct_x$ to the re-encryption device 60 and the decryption device 70 via the transmission channel 80.

The ciphertext $oct_x$ may be transmitted by a method such as postal mail, instead of being transmitted via the transmission channel 80. The ciphertext $oct_x$ may be transmitted to only one of the re-encryption device 60 and the decryption device 70 as necessary.

(Step S41: Acquisition Process)

The acquisition unit 511 acquires the public key pk transmitted by the common parameter generation device 20. The acquisition unit 511 writes the public key pk in the memory 52.

The acquisition unit 511 acquires a parameter $\vec{x} := (x_1, \ldots, x_n)$ and the message m. Specifically, the acquisition unit 511 acquires the parameter $\vec{x}$ and the message m that are input by an administrator of the encryption device 50. The acquisition unit 511 writes the parameter $\vec{x}$ and the message m in the memory 52. The parameter $\vec{x}$ represents attributes or the like indicating the access range for the ciphertext $oct_x$.

(Step S42: Encryption Process)

The encryption unit 512 generates random numbers, as indicated in Formula 127.

$$\varsigma, \omega_0, \omega_1, \varphi_0, \varphi_1 \xleftarrow{U} \mathbb{F}_q \quad \text{[Formula 127]}$$

The encryption unit 512 generates a cipher element $c_0$, a cipher element $c_1$, and a cipher element C, as indicated in Formula 128.

$$c_0 := (\varsigma, \omega_0 \vec{x}, 0^n, 0^n, \varphi_0)_{\mathbb{B}_0},$$

$$c_1 := \varsigma b_{1,0} + \omega_1 c + \varphi_1 b_{1,3n+2},$$

$$C := m \cdot g_T^{\varsigma} \quad \text{[Formula 128]}$$

(Step S43: Transmission Process)

The transmission unit 513 transmits the ciphertext $oct_x$ in which the parameter $\vec{x}$, the cipher element $c_0$, the cipher element $c_1$, and the cipher element C are set to the re-encryption device 60 and the decryption device 70.

Operation of Re-encryption Device 60

Figure 12:
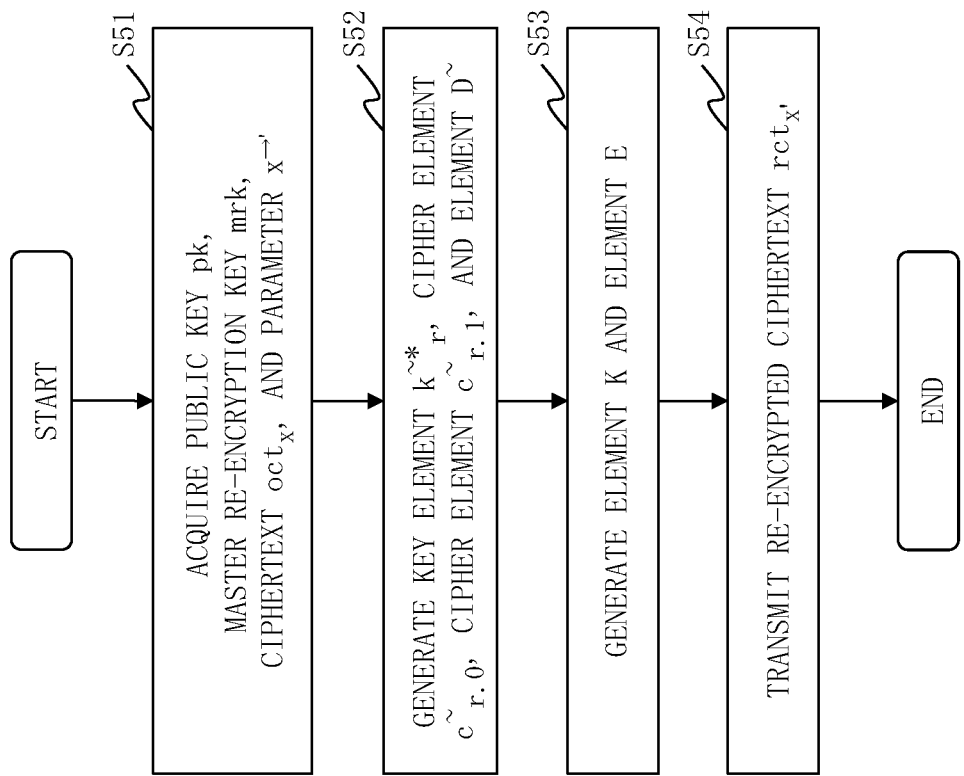
FIG. 12 is a flowchart illustrating operation of the re-encryption device 60 according to the first embodiment.

Referring to FIG. 12, operation of the re-encryption device 60 according to the first embodiment will be described.

A procedure for the operation of the re-encryption device 60 according to the first embodiment is equivalent to a re-encryption method according to the first embodiment. A program that realizes the operation of the re-encryption device 60 according to the first embodiment is equivalent to a re-encryption program according to the first embodiment.

The re-encryption device 60 generates a re-encrypted ciphertext $rct_{x'}$, based on the public key pk and the master re-encryption key mrk. The re-encryption device 60 transmits the re-encrypted ciphertext $rct_{x'}$ to the decryption device 70 via the transmission channel 80.

The re-encrypted ciphertext $rct_{x'}$ may be transmitted by a method such as postal mail, instead of being transmitted via the transmission channel 80.

(Step S51: Acquisition Process)

The acquisition unit 611 acquires the public key pk transmitted by the common parameter generation device 20 and the master re-encryption key mrk transmitted by the master re-encryption key generation device 40. The acquisition unit 611 writes the public key pk and the master re-encryption key mrk in the memory 62.

The acquisition unit 611 acquires the ciphertext $oct_x$, which is a target ciphertext to be re-encrypted, transmitted by the encryption device 50. The acquisition unit 611 writes the target ciphertext $oct_x$ in the memory 62.

The acquisition unit 611 acquires a parameter $\vec{x}' := (x'_1, \ldots, x'_n)$. Specifically, the acquisition unit 611 accepts the parameter $\vec{x}'$ that is input by an administrator of the re-encryption device 60. The acquisition unit 611 writes the parameter $\vec{x}'$ in the memory 62. The parameter $\vec{x}'$ represents attributes or the like indicating the access range for the re-encrypted ciphertext $rct_{x'}$. That is, the parameter $\vec{x}'$ indicates the changed access range.

(Step S52: Re-Encryption Key Generation Process)

The re-encryption key generation unit 612 generates random numbers, as indicated in Formula 129.

$$\vec{\eta} \xleftarrow{U} \mathbb{F}_q^n, r', \tilde{r}, \xi_r, \tilde{\varphi}_{r,0}, \tilde{\varphi}_{r,1}, \tilde{\omega}_{r,0}, \tilde{\omega}_{r,1} \xleftarrow{U} \mathbb{F}_q \quad \text{[Formula 129]}$$

The re-encryption key generation unit 612 generates a key element $\tilde{k}^*_r$, cipher elements $\tilde{c}_r$ ($\tilde{c}_{r,0}$ and $\tilde{c}_{r,1}$), and an element $\tilde{D}$, as indicated in Formula 130.

$$\tilde{k}^*_r := \tilde{r} k^*_r + (0, 0^n, 0^n, \vec{\eta}', 0)_{\mathbb{B}_1^*}$$

$$\tilde{c}_{r,0} := c_r + (0, \omega_{r,0} \vec{x}', 0^n, 0^n, \tilde{\varphi}_r, 0)_{\mathbb{B}_0},$$

$$\tilde{c}_{r,1} := (\tilde{\varsigma}_r, \tilde{\omega}_{r,1} \vec{x}', 0^n, 0^n, \tilde{\varphi}_{r,1})_{\mathbb{B}_0},$$

$$\tilde{D} := D \cdot G(g_T^{\tilde{\xi}_r}) \cdot \tilde{r} \quad \text{[Formula 130]}$$

In the key element $\tilde{k}^*{}_r$, a random number $\tilde{r}$ is embedded in the key element $\tilde{k}^*r$, as indicated in Formula 130. In the cipher elements $\tilde{c}^\sim_r$, the parameter $\vec{x}'$ indicating the changed access range is set and a random number $\tilde{\zeta}_r$ is embedded. In the element $\tilde{D}$, the random number $\tilde{\zeta}_r$ is embedded to encrypt the random number $\tilde{r}$.

The re-encryption key generation unit 612 writes the key element $\tilde{k}^*{}_r$, the cipher elements $\tilde{c}^\sim_r$ ($\tilde{c}^\sim_{r,0}$ and $\tilde{c}^\sim_{r,1}$), and the element D in the memory 62.

(Step S53: Re-Encryption Process)

The re-encryption unit 613 generates an element K and an element E, as indicated in Formula 131.

$$K:=e(c_1,\tilde{k}^*_r)r', E:=\tilde{D}\cdot r' \quad\text{}$$

As indicated in Formula 131, the element K is generated by computing a pairing operation between the cipher element $c_1$ and a decryption key $\tilde{k}^\sim_r$ so as to decrypt the cipher element $c_1$ with the decryption key $\tilde{k}^*{}_r$. In the element K, a random number r' is embedded. In the element E, the random number r' is embedded in the element D.

(Step S54: Transmission Process)

The transmission unit 614 transmits the re-encrypted ciphertext $rct_{x'}$ in which the parameter $\vec{x}'$, the cipher elements $\tilde{c}^\sim_r$ ($\tilde{c}^\sim_{r,0}$ and $\tilde{c}^\sim_{r,1}$), the element E, the element K, and the cipher element C are set to the decryption device 70 via the transmission channel 80.

Operation of Decryption Device 70

Referring to FIG. 13, operation of the decryption device 70 according to the first embodiment will be described.

A procedure for the operation of the decryption device 70 according to the first embodiment is equivalent to a decryption method according to the first embodiment. A program that realizes the operation of the decryption device 70 according to the first embodiment is equivalent to a decryption program according to the first embodiment.

The decryption device 70 decrypts the ciphertext $oct_x$ generated by the encryption device 50 and the re-encrypted ciphertext $rct_{x'}$ generated by the re-encryption device 60.

(Step S61: Acquisition Process)

The acquisition unit 711 acquires the user secret key $dk_v$ transmitted by the user secret key generation device 30. The acquisition unit 711 writes the user secret key $dk_v$ in the memory 72.

The acquisition unit 711 acquires a ciphertext ct, which is one of the ciphertext $oct_x$ transmitted by the encryption device 50 and the re-encrypted ciphertext $rct_{x'}$ transmitted by the re-encryption device 60. The acquisition unit 711 writes the ciphertext ct in the memory 72.

(Step S62: Determination Process)

The determination unit 712 determines whether the ciphertext ct acquired in step S61 is the ciphertext $oct_x$ or the re-encrypted ciphertext $rct_{x'}$. Specifically, the determination unit 712 determines whether the ciphertext ct is the ciphertext $oct_x$ or the re-encrypted ciphertext $rct_{x'}$, based on the number of elements of the ciphertext ct.

If the ciphertext ct is the ciphertext $oct_x$, the determination unit 712 advances the process to step S63. If the ciphertext ct is the re-encrypted ciphertext $rct_{x'}$, the determination unit 712 advances the process to step S64.

(Step S63: First Decryption Process)

The decryption unit 713 decrypts the ciphertext ct (=ciphertext $oct_x$) to generate a message m', as indicated in Formula 132.

$$m':=C/e(c_0,k^*) \qquad \text{[Formula 132]}$$

Note that if the parameter $\vec{x}$ set in the ciphertext ct and the parameter $\vec{v}$ set in the user secret key $dk_v$ correspond to each other, the ciphertext ct is decrypted correctly, and the message m' matches the message m. That the parameter $\vec{x}$ and the parameter $\vec{v}$ correspond to each other means that $\vec{x}\cdot\vec{v}=0$ holds.

(Step S64: Second Decryption Process) The decryption unit 713 decrypts the ciphertext ct (=re-encrypted ciphertext $rct_{x'}$) to generate a message m', as indicated in Formula 133.

$$R:=\frac{E}{(G(e(\tilde{c}_{r,0},k'^*))\cdot G(e(\tilde{c}_{r,1},k'^*)))}, \qquad \text{[Formula 133]}$$

$$m':=C/K^{1/R}$$

Note that if the parameter $\vec{x}'$ set in the ciphertext ct and the parameter $\vec{v}$ set in the user secret key $dk_v$ correspond to each other, the ciphertext ct is decrypted correctly and the message m' matches the message m. That the parameter $\vec{x}'$ and the parameter $\vec{v}$ correspond to each other means that $\vec{x}'\cdot\vec{v}=0$ holds.

(Step S65: Output Process)

The decryption unit 713 outputs the message m' generated in step S63 or step S64 via the communication interface 64.

Note that the element E indicated in Formula 131 is as indicated in Formula 134.

$$E:=\tilde{D}\cdot r' = \qquad \text{[Formula 134]}$$
$$D\cdot G(g_T^{\tilde{\varsigma}_r})\cdot\tilde{r}\cdot r' = G(g_T^{\varsigma_r})\cdot G(g_T^{\tilde{\varsigma}_r})\cdot\tilde{r}\cdot r'\cdot r = G(g_T^{\tilde{r}r' r \varsigma_r \tilde{\varsigma}_r})$$

If $\vec{x}'\cdot\vec{v}=0$, the two pairing operations indicated in Formula 133 are as indicated in Formula 135.

$$e(\tilde{c}_{r,0},k'^*)=g_T{}^{\varsigma_r},$$

$$e(\tilde{c}_{r,1},k'^*)=g_T{}^{\tilde{\varsigma}_r},$$

where $$\tilde{c}_{r,0}=(\varsigma_r,\tilde{\omega}_{r,0}\vec{x}',0^n,0^n,\varphi_r+\tilde{\varphi}_{r,0})_{\mathbb{B}_0},$$

$$\tilde{c}_{r,1}=(\tilde{\varsigma}_r,\tilde{\omega}_{r,1}\vec{x}',0^n,0^n,\tilde{\varphi}_{r,1})_{\mathbb{B}_0},$$

$$k'^*:=(1,\delta\vec{v}',0^n,\eta,0)_{\mathbb{B}^*_0}$$

Therefore, the element R indicated in Formula 133 is as indicated in Formula 136.

$$R:=\frac{E}{(G(e(\tilde{c}_{r,0},k'^*))\cdot G(e(\tilde{c}_{r,1},k'^*)))} = \frac{G(g_T^{\tilde{r}r' r \varsigma_r \tilde{\varsigma}_r})}{G(g_T^{\varsigma_r}\cdot g_T^{\tilde{\varsigma}_r})} = G(g_T^{\tilde{r}r'r}) \qquad \text{[Formula 136]}$$

The element K indicated in Formula 131 is as indicated in Formula 137.

$$K:=e(c_1,\tilde{k}^*_r)^{r'}=g_T{}^{\tilde{r}r'r}\varsigma \qquad \text{[Formula 137]}$$

where $$c_1:=(\varsigma,\omega_1\omega\vec{y},0^n,0^n\omega_1\varphi+\varphi_1)_{\mathbb{B}_1}$$

$$\tilde{k}_r^*:=(\tilde{r}r,\tilde{r}\delta_r\vec{w},0^n,\tilde{r}\vec{\eta},+\vec{\eta}',0)_{\mathbb{B}^*_1}$$

Therefore, the message m' indicated in Formula 133 is as indicated in Formula 138.

$$m':C/K^{1/R}=(m \cdot g_T \; \varsigma)/(g_T^{\tilde{r}' \cdot r} \; \varsigma)^{1/G(g_T^{\tilde{r}' \cdot r})}=(m \cdot g_T \; \varsigma)/g_T$$
$$\varsigma=m$$

Note that the parameter $x^{\rightarrow}$ is set in the cipher element $c_0$ of the ciphertext $oct_x$ generated by the encryption device 50. The master re-encryption key mrk does not include a key element in which the parameter $v^{\rightarrow}$ corresponding to the parameter $x^{\rightarrow}$ is set. Therefore, the master re-encryption key mrk cannot decrypt any ciphertext $oct_x$ generated by the encryption device 50.

The element c, in which the parameter $y^{\rightarrow}$ is set, is embedded in the cipher element $c_1$ of the ciphertext $oct_x$ generated by the encryption device 50. The master re-encryption key mrk includes the key element $k^*_r$, in which the parameter $w^{\rightarrow}$ corresponding to the parameter $y^{\rightarrow}$ is set. Therefore, the master re-encryption key mrk can generate a re-encryption key for changing the access range for any ciphertext $oct_x$ generated by the encryption device 50.

\*\*\*Effects of First Embodiment\*\*\*

As described above, in the cryptographic system 10 according to the first embodiment, re-encryption is performed using a master re-encryption key that cannot decrypt any ciphertext generated by the encryption device, but can generate a re-encryption key for changing an access range for any ciphertext generated by the encryption device.

Since a re-encryption key for changing an access range for any ciphertext can be generated with the master re-encryption key, a secret key of a user and a master public key are not required for generating a re-encryption key. Therefore, the possibility of leakage of the secret key of the user and the master public key can be reduced, resulting in enhanced security. In addition, no ciphertext can be decrypted with the master re-encryption key, so that unauthorized decryption using the master re-encryption key will not be performed, resulting in enhanced security.

\*\*\*Other Configurations\*\*\*

<First Variation>

In the first embodiment, the functional components are realized by software. However, as a first variation, the functional components may be realized by hardware. With regard to this first variation, differences from the first embodiment will be described.

When the functions are realized by hardware, the common parameter generation device 20 includes an electronic circuit in place of the processor 21, the memory 22, and the storage 23. The electronic circuit is a dedicated circuit that realizes the functions of the functional components of the common parameter generation device 20, the memory 22, and the storage 23.

When the functions are realized by hardware, the user secret key generation device 30 includes an electronic circuit in place of the processor 31, the memory 32, and the storage 33. The electronic circuit is a dedicated circuit that realizes the functions of the functional components of the user secret key generation device 30, the memory 32, and the storage 33.

When the functions are realized by hardware, the master re-encryption key generation device 40 includes an electronic circuit in place of the processor 41, the memory 42, and the storage 43. The electronic circuit is a dedicated circuit that realizes the functions of the functional components of the master re-encryption key generation device 40, the memory 42, and the storage 43.

When the functions are realized by hardware, the encryption device 50 includes an electronic circuit in place of the processor 51, the memory 52, and the storage 53. The electronic circuit is a dedicated circuit that realizes the functions of the functional components of the encryption device 50, the memory 52, and the storage 53.

When the functions are realized by hardware, the re-encryption device 60 includes an electronic circuit in place of the processor 61, the memory 62, and the storage 63. The electronic circuit is a dedicated circuit that realizes the functions of the functional components of the re-encryption device 60, the memory 62, and the storage 63.

When the functions are realized by hardware, the decryption device 70 includes an electronic circuit in place of the processor 71, the memory 72, and the storage 73. The electronic circuit is a dedicated circuit that realizes the functions of the functional components of the decryption device 70, the memory 72, and the storage 73.

The electronic circuit is assumed to be a single circuit, a composite circuit, a programmed processor, a parallel-programmed processor, a logic IC, a gate array (GA), an application specific integrated circuit (ASIC), or a field-programmable gate array (FPGA).

The functions of the functional components of the common parameter generation device 20 may be realized by one electronic circuit, or the functions of the functional components of the common parameter generation device 20 may be distributed among and realized by a plurality of electronic circuits. Similarly, with regard to each of the user secret key generation device 30, the master re-encryption key generation device 40, the encryption device 50, the re-encryption device 60, and the decryption device 70, the functions of the functional components may be realized by one electronic circuit, or the functions of the functional components may be distributed among and realized by a plurality of electronic circuits.

<Second Variation>

As a second variation, some of the functions may be realized by hardware, and the rest of the functions may be realized by software. That is, some of the functions of the functional components may be realized by hardware, and the rest of the functions may be realized by software.

Each of the processors 21, 31, 41, 51, 61, 71, the memories 22, 32, 42, 52, 62, 72, the storages 23, 33, 43, 53, 63, 73, and the electronic circuit is referred to as processing circuitry. That is, the functions of the functional components are realized by the processing circuitry.

REFERENCE SIGNS LIST

10: cryptographic system, 20: common parameter generation device, 21: processor, 22: memory, 23: storage, 24: communication interface, 211: acquisition unit, 212: common parameter generation unit, 213: basis generation unit, 214: master key generation unit, 215: transmission unit, 30: user secret key generation device, 31: processor, 32: memory, 33: storage, 34: communication interface, 311: acquisition unit, 312: user secret key generation unit, 313: transmission unit, 40: master re-encryption key generation device, 41: processor, 42: memory, 43: storage, 44: communication interface, 411: acquisition unit, 412: master re-encryption key generation unit, 413: transmission unit, 50: encryption device, 51: processor, 52: memory, 53: storage, 54: communication interface, 511: acquisition unit, 512: encryption unit, 513: transmission unit, 60: re-encryption device, 61: processor, 62: memory, 63: storage, 64: communication interface, 611: acquisition unit, 612: re-encryption key generation unit, 613: re-encryption unit, 614: transmission unit, 70: decryption device, 71: processor, 72:

memory, 73: storage, 74: communication interface, 711: acquisition unit, 712: determination unit, 713: decryption unit, 80: transmission channel

The invention claimed is:

1. A re-encryption device for changing an access range for ciphertexts comprising:
   processing circuitry to:
   generate a re-encryption key for re-encrypting a target ciphertext generated by an encryption device, using a master re-encryption key that cannot decrypt the target ciphertext generated by the encryption device, but can generate the re-encryption key for changing an access range for the target ciphertext generated by the encryption device while the target ciphertext remains encrypted, and re-encrypt the target ciphertext to generate a re-encrypted ciphertext, using the generated re-encryption key,
   wherein the master re-encryption key includes a key element $k^*_r$ in which a parameter $\vec{w}$ is set, the parameter $\vec{w}$ corresponding to a parameter $\vec{y}$ set in a cipher element $c_1$ included in the target ciphertext generated by the encryption device,
   wherein the re-encryption key for re-encrypting the target ciphertext includes: (i) a key element $k^{\sim *}r$ in which a random number $r^\sim$ is embedded in the key element $k^{\sim *}r$, (ii) a cipher element $c^\sim r$ in which a parameter $\vec{x}'$ indicating a changed access range is set, and (iii) an element $D^\sim$ in which the random number $r^\sim$ is encrypted, and
   wherein the re-encrypted ciphertext includes: (i) element K in which the cipher element $c_1$ is decrypted with the key element $k^{\sim *}r$, (ii) the cipher element $c^\sim r$, and (iii) an element E in which the element $D^\sim$ is set.

2. The re-encryption device according to claim 1, wherein the processing circuitry generates the element K in which the cipher element $c_1$ is decrypted with the key element $k^{\sim *}r$ and a random number r' is embedded, and generates the element E in which the random number r' is embedded in the element $D^\sim$.

3. The re-encryption device according to claim 2, wherein the processing circuitry generates the cipher element $c^\sim r$ in which a random number $\zeta^\sim_r$ is embedded, and generates the element $D^\sim$ in which the random number $\zeta^\sim_r$ is embedded.

4. The re-encryption device according to claim 3, wherein the processing circuitry generates the re-encryption key including the key element $k^{\sim *}r$, the cipher element $c^\sim_r$, and the element $D^\sim$ indicated in Formula 2,
   using the master re-encryption key indicated in Formula 1, and
   generates the re-encrypted ciphertext including the element K and the element E indicated in Formula 3 and including the cipher element $c^\sim_r$.

$$k^*_r := (r, \delta_r \vec{w}, 0^n, \vec{\eta}_r, 0)_{\mathbb{B}^*_1}, \quad \text{[Formula 1]}$$

$$c_r := (\zeta_r, 0^n, 0^n, 0^n, \varphi_r)_{\mathbb{B}_0},$$

$$D := G(g_T^{\zeta_r}) \cdot r \in \mathbb{F}_q,$$

Where $$\vec{\eta}_r \xleftarrow{U} \mathbb{F}_q^n, r, \zeta_r, \varphi_r, \delta_r \xleftarrow{U} \mathbb{F}_q,$$

G : Encode function $\mathbb{G}_T \to \mathbb{F}_q$, $g_T \in \mathbb{G}_T$, $\mathbb{B}_0, \mathbb{B}^*_1$ : Base -continued $$k^{\sim *}_r := \tilde{r} k^*_r + (0, 0^n, 0^n, \vec{\eta}'_r, 0)_{\mathbb{B}^*_1}, \quad \text{[Formula 2]}$$

$$c^\sim_r := (c^\sim_{r,0}, c^\sim_{r,1}),$$

$$c^\sim_{r,0} := (0, \tilde{w}_{r,0} \vec{x}', 0^n, 0^n, \tilde{\varphi}_{r,0})_{\mathbb{B}_0},$$

$$c^\sim_{r,1} := (\tilde{\zeta}_r, \tilde{w}_{r,1} \vec{x}', 0^n, 0^n, \tilde{\varphi}_{r,1})_{\mathbb{B}_0},$$

$$D^\sim = D \cdot G(g_T^{\tilde{\zeta}_r}) \cdot \tilde{r},$$

Where $$\vec{\eta}'_r \xleftarrow{U} \mathbb{F}_q^n, r', \tilde{r}, \tilde{\zeta}_r, \tilde{\varphi}_{r,0}, \tilde{\varphi}_{r,1}, \tilde{w}_{r,0}, \tilde{w}_{r,1} \xleftarrow{U} \mathbb{F}_q,$$

$$K := e(c_1, k^{\sim *}_r)^{r'}, E := \tilde{D} \cdot r' \quad \text{[Formula 3]}$$

Where $$c_1 = \zeta b_{1,0} + \omega_1 c + \varphi_1 b_{1,3n+2},$$

$$c := (0, w \vec{y}, 0^n, 0^n, \varphi)_{\mathbb{B}_1}$$

$$\zeta, w, w_1, \varphi, \varphi_1 \xleftarrow{U} \mathbb{F}_q,$$

$b_{1,0}, b_{1,3n+2}$ : basis vector.

$\vec{\eta}_r, r, \zeta_r, \varphi_r, \delta_r$ correspond to random numbers, $\eta$ corresponds to a number of elements, $c_r$ correspond to a cipher element, G: Encode function $\mathbb{G}_T \to \mathbb{F}_q$, $g_T \in \mathbb{B}_T$, $\mathbb{B}_0, \mathbb{B}^*_1$: Base $\mathbb{G}_q$ corresponds to a vector representation to a finite field, $$k^{\sim *}_r := \tilde{r} k^*_r + (0, 0^n, 0^n, \vec{\eta}'_r, 0)_{\mathbb{B}^*_1}, \quad \text{[Formula 2]}$$

$$c^\sim_r := (c^\sim_{r,0}, c^\sim_{r,1}),$$

$$\left[ c^\sim_{r,0} := cr + (0, \tilde{w}_{r,0} \vec{x}', 0^n, 0^n, \tilde{\varphi}_{r,0})_{\mathbb{B}_0} \right],$$

$$c^\sim_{r,1} := (\tilde{\zeta}_r, \tilde{w}_{r,1} \vec{x}', 0^n, 0^n, \tilde{\varphi}_{r,1})_{\mathbb{B}_0}$$

$$D^\sim := D \cdot G(g_T^{\tilde{\zeta}_r}) \cdot \tilde{r},$$

Where $$\vec{\eta}'_r \leftarrow \mathbb{F}_q^n, r', \tilde{r}, \tilde{\zeta}_r, \tilde{\varphi}_{r,0}, \tilde{\varphi}_{r,1}, \tilde{w}_{r,0}, \tilde{w}_{r,1} \xleftarrow{U} \mathbb{F}_q,$$

$\vec{\eta}'_r, r', \tilde{r}, \tilde{\zeta}_r, \tilde{\varphi}_{r,0}, \tilde{\varphi}_{r,1}, \tilde{w}_{r,0}, \tilde{w}_{r,1}$ correspond to random numbers, $$K := e(c_1, k^{\sim *}_r)^{r'}, E := D^\sim \cdot r' \quad \text{[Formula 3]}$$

Where $$c_1 := \zeta b_{1,0} + w_1 c + \varphi_1 b_{1,3n+2},$$

$$c := ((0, w \vec{y}, 0^n, 0^n, \varphi))_{\mathbb{B}_1}$$

$$\zeta, w, w_1, \varphi, \varphi_1 \xleftarrow{U} \mathbb{F}_q,$$

$\zeta, w, w_1, \varphi, \varphi_1$ correspond to random numbers, $b_{1,0}, b_{1,3n+2}$: basis vector.

5. A re-encryption method for changing an access range for ciphertexts comprising:

generating a re-encryption key for re-encrypting a target ciphertext generated by an encryption device, using a master re-encryption key that cannot decrypt the target ciphertext generated by the encryption device, but can generate a re-encryption key for changing an access range for the target ciphertext generated by the encryption device while the target ciphertext remains encrypted; and re-encrypting the target ciphertext to generate a re-encrypted ciphertext, using the re-encryption key, wherein the master re-encryption key includes a key element $k^*_r$ in which a parameter $\vec{w}$ is set, the parameter $\vec{w}$ corresponding to a parameter $\vec{y}$ set in a cipher element $c_1$ included in the target ciphertext generated by the encryption device, wherein the re-encryption key for re-encrypting the target ciphertext includes: (i) a key element $\tilde{k}^*r$ in which a random number $\tilde{r}$ is embedded in the key element $k^*_r$, (ii) a cipher element $\tilde{c}r$ in which a parameter $\vec{x}'$ indicating a changed access range is set, and (iii) an element $\tilde{D}$ in which the random number r is encrypted, and wherein the re-encrypted ciphertext includes: (i) an element K in which the cipher element $c_1$ is decrypted with the key element $\tilde{k}^*r$, (ii) the cipher element $\tilde{c}r$, and (iii) an element E in which the element $\tilde{D}$ is set.

6. A non-transitory computer readable medium storing a re-encryption program for changing an access range for ciphertexts that causes a computer to function as a re-encryption device to perform:

a re-encryption key generation process of generating a re-encryption key for re-encrypting a target ciphertext generated by an encryption device, using a master re-encryption key that cannot decrypt the target ciphertext generated by the encryption device, but can generate a re-encryption key for changing an access range for the target ciphertext generated by the encryption device while the target ciphertext remains encrypted; and a re-encryption process of re-encrypting the target ciphertext to generate a re-encrypted ciphertext, using the re-encryption key generated by the re-encryption key generation process, wherein the master re-encryption key includes a key element $k^*_r$ in which a parameter $\vec{w}$ is set, the parameter $\vec{w}$ corresponding to a parameter r set in a cipher element $c_1$ included in the target ciphertext generated by the encryption device, wherein the re-encryption key for re-encrypting the target ciphertext includes: (i) a key element $\tilde{k}^*r$ in which a random number $\tilde{r}$ is embedded in the key element $k^*_r$, (ii) a cipher element $\tilde{c}r$ in which a parameter $\vec{x}'$ indicating a changed access range is set, and (iii) an element $\tilde{D}$ in which the random number $\tilde{r}$ is encrypted, and wherein the re-encrypted ciphertext includes: (i) an element K in which the cipher element $c_1$ is decrypted with the key element $\tilde{k}^*r$, (ii) the cipher element $\tilde{c}r$, and (iii) an element E in which the element $\tilde{D}$ is set.

7. A cryptographic system comprising:

an encryption device comprising a processing circuitry to generate a ciphertext;

a master re-encryption key generation device comprising a processing circuitry to generate a master re-encryption key that cannot decrypt the ciphertext generated by the encryption device, but can generate a re-encryption key for changing an access range for the ciphertext generated by the encryption device while the ciphertext remains encrypted, the master re-encryption key including a key element $k^*_r$ in which a parameter $\vec{w}$ is set, the parameter $\vec{w}$ corresponding to a parameter $\vec{y}$ set in a cipher element $c_1$ included in the ciphertext generated by the encryption device;

a re-encryption device comprising a processing circuitry to generate a re-encryption key for re-encrypting a target ciphertext generated by the encryption device, using the master re-encryption key generated by the master re-encryption key generation device, the re-encryption key including: (i) a key element $\tilde{k}^*r$ in which a random number $\tilde{r}$ is embedded in the key element $k^*r$, (ii) a cipher element $\tilde{c}r$ in which a parameter $\vec{x}'$ indicating a changed access range is set, and (iii) an element $\tilde{D}$ in which the random number $\tilde{r}$ is encrypted, and re-encrypt the target ciphertext, using the generated re-encryption key, so as to generate a re-encrypted ciphertext including: (i) an element K in which the cipher element ci is decrypted with the key element $\tilde{k}^*r$, (ii) the cipher element $\tilde{c}r$, and (iii) an element E in which the element $\tilde{D}$ is set; and a decryption device comprising a processing circuitry to decrypt at least one of the ciphertext generated by the encryption device and the re-encrypted ciphertext generated by the re-encryption device.

* * * * *